US010457425B2

(12) United States Patent
Aston et al.

(10) Patent No.: US 10,457,425 B2
(45) Date of Patent: Oct. 29, 2019

(54) SPACECRAFT WITH ANTI NADIR BATTERY RADIATOR

(71) Applicant: THE BOEING COMPANY, Chicago, IL (US)

(72) Inventors: Richard W. Aston, Brea, CA (US); Michael J. Langmack, Huntington Beach, CA (US); Anna M. Tomzynska, Seal Beach, CA (US)

(73) Assignee: The Boeing Company, Chicago, IL (US)

( * ) Notice: Subject to any disclaimer, the term of this patent is extended or adjusted under 35 U.S.C. 154(b) by 1074 days.

(21) Appl. No.: 13/655,224

(22) Filed: Oct. 18, 2012

(65) Prior Publication Data

US 2014/0110531 A1 Apr. 24, 2014

(51) Int. Cl.
*B64G 1/42* (2006.01)
*B64G 1/50* (2006.01)

(52) U.S. Cl.
CPC ............... *B64G 1/50* (2013.01); *B64G 1/425* (2013.01); *Y10T 29/4935* (2015.01); *Y10T 29/49622* (2015.01)

(58) Field of Classification Search
CPC .......... B64G 1/427; B64G 1/428; B64G 1/42; B64G 1/425
USPC ................................ 244/171.8, 172.6, 158.1
See application file for complete search history.

(56) References Cited

U.S. PATENT DOCUMENTS 4,830,097 A * 5/1989 Tanzer ..................... B64G 1/50 122/366
5,310,141 A * 5/1994 Homer ................... B64G 1/425 136/222
5,372,183 A * 12/1994 Strickberger ................... 165/41
5,386,953 A * 2/1995 Stuart ........................ 244/158.4
5,634,612 A * 6/1997 Faisant .................. B64G 1/425 244/158.1
5,927,654 A * 7/1999 Foley ..................... B64G 1/222 244/172.6
5,954,298 A * 9/1999 Basuthakur et al. ...... 244/171.8
5,957,408 A * 9/1999 Hall et al. .................. 244/158.1
6,073,888 A * 6/2000 Gelon et al. ............... 244/171.8
6,196,501 B1 * 3/2001 Hall et al. .................. 244/171.7
6,207,315 B1 * 3/2001 Gelon .................... B64G 1/425 244/171.7
6,369,546 B1 4/2002 Canter
7,762,499 B1 * 7/2010 Hentosh et al. ........... 244/171.8
7,874,520 B2 * 1/2011 McKinnon ............. B64G 1/503 244/171.8
2007/0029446 A1 * 2/2007 Mosher et al. ............ 244/158.1
2007/0221787 A1 * 9/2007 McKinnon ............. B64G 1/222 244/171.8
2008/0277532 A1 * 11/2008 Wong ......................... 244/171.8
2011/0278399 A1 * 11/2011 Takahashi et al. ........ 244/158.1

* cited by examiner

*Primary Examiner* — Tien Q Dinh
*Assistant Examiner* — Michael A. Fabula
(74) *Attorney, Agent, or Firm* — Haynes & Boone LLP

(57) ABSTRACT

A satellite is disclosed comprising an anti-nadir panel having a first side and a second side. In one or more embodiments, the first side of the anti-nadir panel is mounted to an anti-nadir side of the main body of the satellite. The satellite further comprises at least one battery pack mounted to the second side of the anti-nadir panel, where at least one battery pack comprises at least one battery cell.

28 Claims, 7 Drawing Sheets

FIG. 4A
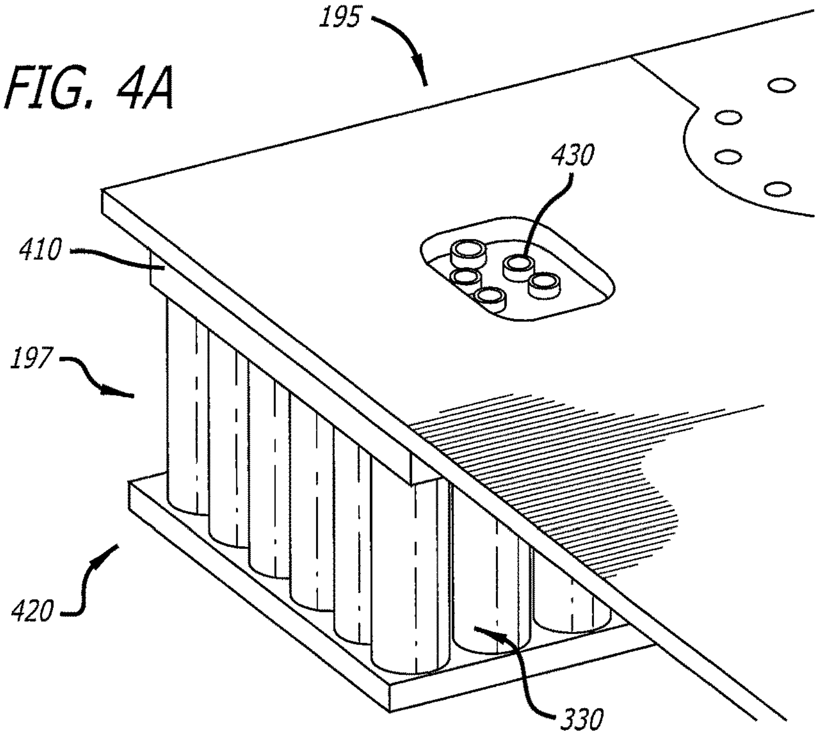
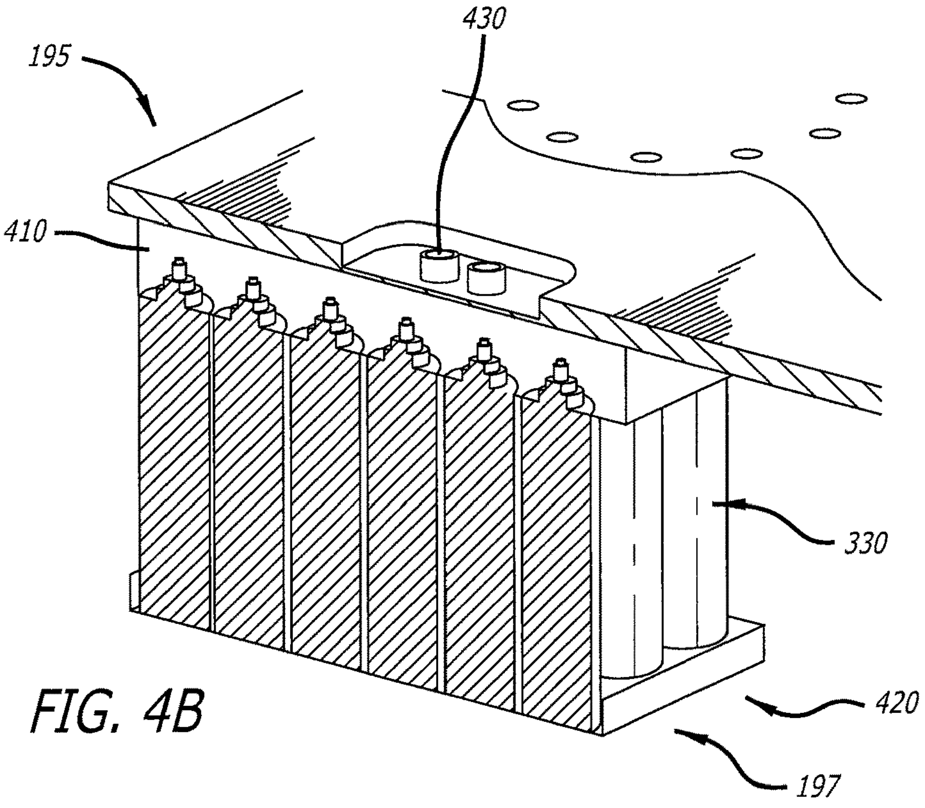
FIG. 4B

SPACECRAFT WITH ANTI NADIR BATTERY RADIATOR

BACKGROUND

The present disclosure relates to spacecraft batteries. In particular, it relates to spacecraft with anti-nadir battery radiator(s). The term "nadir", when referred to a spacecraft such as a satellite, typically refers to an earth-facing portion of the spacecraft, which may be oriented towards the centripetal direction of the earth and in a direction typically opposite the Zenith. Hence, as used herein, the term "anti-nadir" refers to a face, side, panel, and/or portion of a spacecraft that is located away from the direction of the orbit, in the direction of the Zenith, such as a portion of a satellite that faces away from an orbited planet.

Currently, many spacecraft mount their spacecraft batteries on the north and south sides of the spacecraft along with north and south facing battery radiators. This existing solution has several disadvantages. The first disadvantage is that the existing solution requires a dedicated battery support structure to support the batteries. A second disadvantage is that, for the existing solution, the batteries consume north and south facing acreage, which is needed by the payload. A third disadvantage is that this existing solution creates thermal gradients between the various battery cells because the thermal environment on the spacecraft north side differs from the south side due to different sun exposures on the batteries. The present disclosure mitigates all the above-mentioned disadvantages of the existing solution, while minimizing the part count and structural mass related to integrating the batteries to the satellite.

SUMMARY

The present disclosure relates to a method, system, and apparatus for a spacecraft with an anti-nadir battery radiator. In one or more embodiments, the present disclosure teaches a battery system for a satellite that comprises an anti-nadir panel for the satellite having a first side and a second side. In one or more embodiments, the first side of the anti-nadir panel is mounted to the anti-nadir side of the main body of the satellite. The system further comprises at least one battery pack mounted to the second side of the anti-nadir panel. In at least one embodiment, at least one battery pack comprises at least one battery cell.

In one or more embodiments, the anti-nadir panel is substantially rectangular in shape. In at least one embodiment, when two of the battery packs are mounted to the second side of the anti-nadir panel, the two battery packs are disposed diagonally from each other in opposite corners of the anti-nadir panel. In some embodiments, when four of the battery packs are mounted to the second side of the anti-nadir panel, each of the four battery packs are disposed in a different corner of the anti-nadir panel.

In at least one embodiment, the system further comprises at least one radiator. In at least one embodiment, at least one radiator is mounted to at least one battery pack. In some embodiments, at least one radiator is disposed on the side of at least one battery pack that is opposite the anti-nadir panel.

In one or more embodiments, each of the battery packs has substantially the same thermal environment when each of the battery packs has substantially the same sun exposure. In at least one embodiment, each of the battery packs has substantially the same differential cell charge balancing. In some embodiments, at least one of the battery cells is a lithium (Li) ion battery cell. In one or more embodiments, at least one external side of at least one of the battery packs is covered with a thermal blanket.

In at least one embodiment, a method for manufacturing a battery system for a satellite involves providing an anti-nadir panel for the satellite having a first side and a second side. The method further involves mounting the first side of the anti-nadir panel to the anti-nadir side of the main body of the satellite. Further, the method involves mounting at least one battery pack to the second side of the anti-nadir panel. In one or more embodiments, at least one battery pack comprises at least one battery cell.

In one or more embodiments, the method further comprises mounting at least one radiator to at least one battery pack. In at least one embodiment at least one radiator is disposed on the side of at least one battery pack that is opposite the anti-nadir panel. In some embodiments, the method further involves covering at least one external side of at least one of the battery packs with a thermal blanket.

In at least one embodiment, a satellite is disclosed comprising an anti-nadir panel having a first side and a second side. In one or more embodiments, the first side of the anti-nadir panel is mounted to an anti-nadir side of the main body of the satellite. The satellite further comprises at least one battery pack mounted to the second side of the anti-nadir panel, where at least one battery pack comprises at least one battery cell.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 4A is a close-up view of one of the four exemplary battery packs mounted to the exemplary anti-nadir panel of FIG. 3, in accordance with at least one embodiment of the present disclosure.

FIG. 4B is a cutaway view of the exemplary battery pack in FIG. 4A, in accordance with at least one embodiment of the present disclosure.

DESCRIPTION

The methods and apparatus disclosed herein provide an operative system for spacecraft with anti-nadir battery radiator(s). Specifically, this system employs at least one space battery with lithium ion chemistry mounted to a spacecraft (e.g., a geosynchronous earth orbiting (GEO) satellite). In particular, the battery (or batteries) is/are mounted to the spacecraft's anti-nadir panel with the battery radiator(s) oriented in the anti-nadir direction.

The present disclosure provides a method for integrating a battery to a spacecraft in a manner which minimizes the spacecraft structural mass related to the battery mounting structure; provides a thermal environment for the battery where each battery cell has the same sun exposure, thereby minimizing the battery cell to battery cell thermal gradients; simplifies the differential cell charge balancing because the battery cell temperatures are largely the same; and frees up critical spacecraft north and south surfaces for additional payload radiators, which are used to dissipate heat produced from the payload.

The disclosed system and method minimizes the part count and structural mass related to integrating the batteries to the satellite. By employing the disclosed battery system, the battery implementation is approximately 30 Kilograms (kg) lighter than the battery implementation, which employs the current, existing solution. It should be noted that the disclosed battery system is advantageous because it reduces satellite part count and launch mass, which is currently estimated at USD $20,000 per kg, and because it allows for the packaging of more payload on the satellite because the design provides more area for payload radiators.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
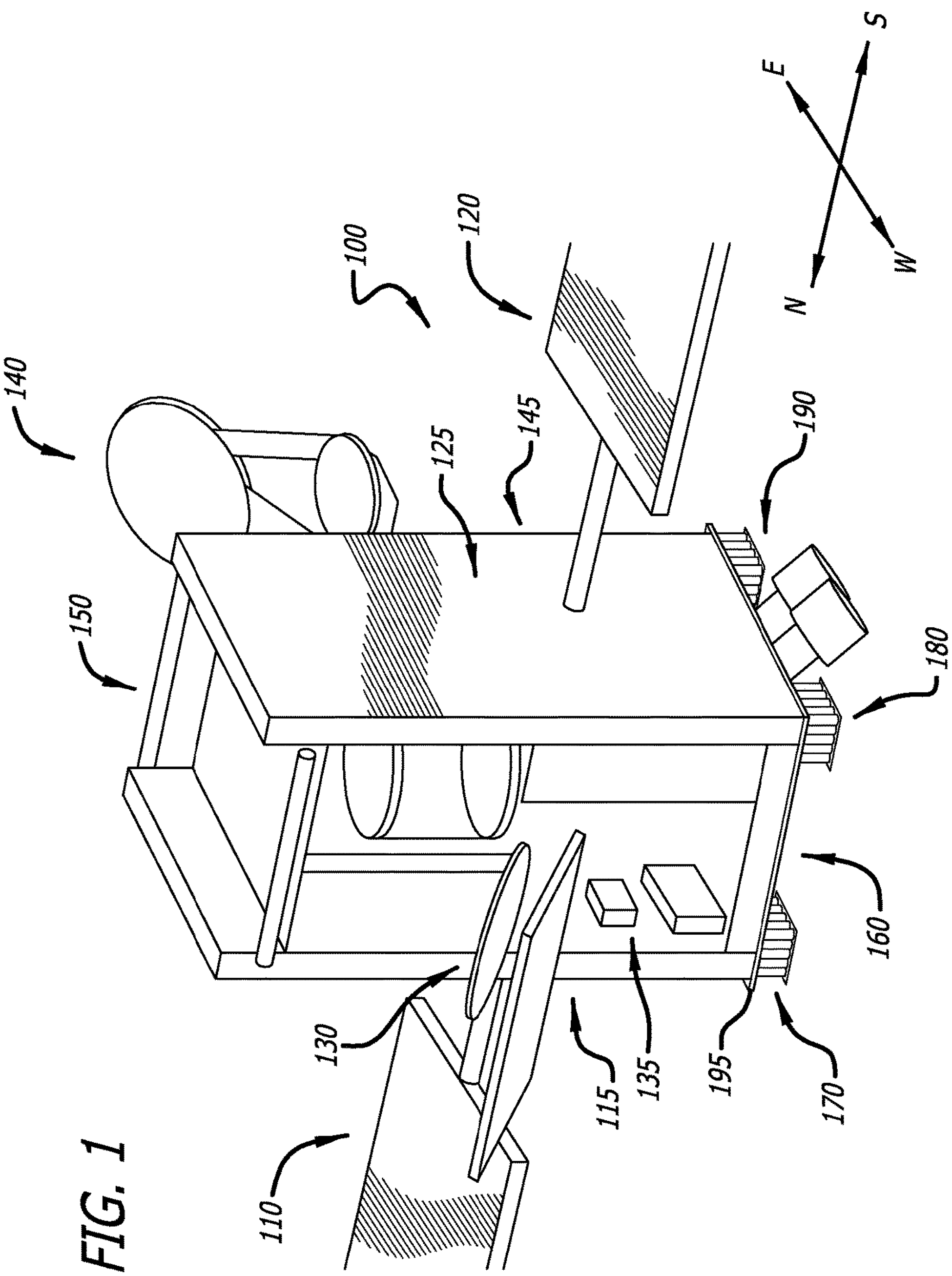
FIG. 1 is diagram of an exemplary satellite employing the disclosed battery system, in accordance with at least one embodiment of the present disclosure.

FIG. 1 is diagram of an exemplary satellite 100 employing the disclosed battery system, in accordance with at least one embodiment of the present disclosure. In this figure, the satellite 100 is shown to have a north solar panel 120 on the north side 125 of the satellite 100, and a south solar panel 110 on the south side 115 of the satellite 100. Also, the satellite 100 has an east side antenna 140 on the east side 145 of the satellite 100, and a west side antenna 130 on the west side 135 of the satellite 100. In addition, the satellite 100 has a nadir (earth facing) side 150 and an anti-nadir (opposite earth facing) side 160. An anti-nadir panel 195 is mounted to the anti-nadir side 160 of the satellite 100. In addition, four battery packs 170, 180, 190 are mounted to the anti-nadir panel 195. It should be noted that in this figure only three of the four battery packs 170, 180, 190 are visible. The fourth battery pack is not shown.

It should be noted that since the battery packs 170, 180, 190 (which can each weigh around 100 pounds) are mounted on the anti-nadir side 160 of the satellite 100 as opposed to the north side 125 and/or south side 115 of the satellite 100, which is currently done by existing solutions, no support structure is needed for the battery packs 170, 180, 190, 197. For the existing solutions, which mount the battery packs on the north and/or south sides of the satellite, support structures for each of the battery packs are needed to support the heavy battery packs during launch. The addition of these support structures adds extra cost and weight to the existing battery system designs.

The exemplary satellite 100 depicted in FIG. 1 is a geosynchronous earth orbiting (GEO) satellite. However, it should be noted that various different types of satellites may employ the disclosed battery system. Different types of satellites that may employ the disclosed battery system include, but are not limited to, various different GEO satellites, various different medium earth orbiting (MEO) satellites, and various different lower earth orbiting (LEO) satellites.

Figure 2:
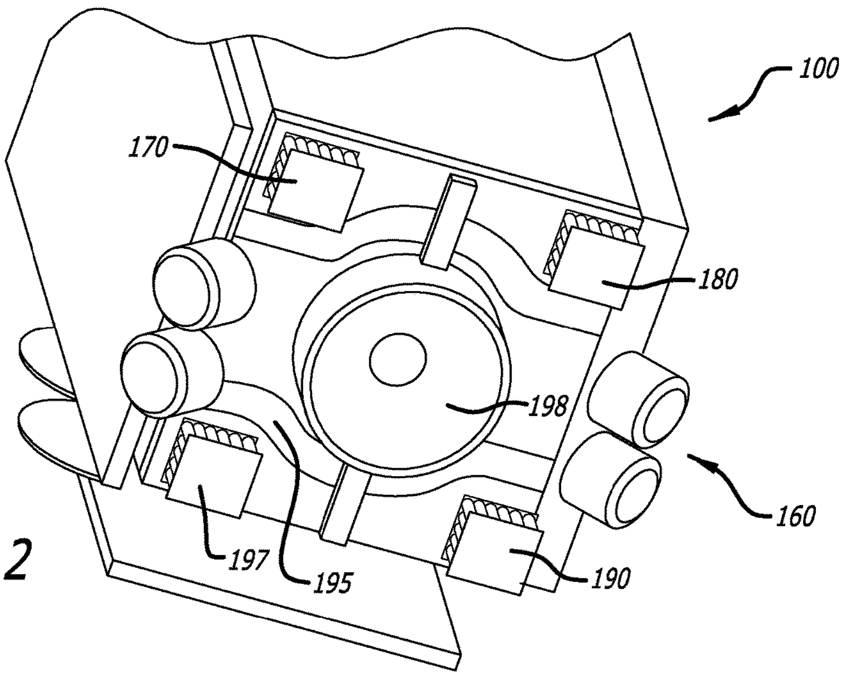
FIG. 2 is a diagram showing a view of the anti-nadir side of the exemplary satellite of FIG. 1, in accordance with at least one embodiment of the present disclosure.

FIG. 2 is a diagram showing a view of the anti-nadir side 160 of the exemplary satellite 100 of FIG. 1, in accordance with at least one embodiment of the present disclosure. In this figure, four battery packs 170, 180, 190, 197 are shown to be mounted to the anti-nadir panel 195, which is mounted to the anti-nadir side 160 of the satellite 100. The four battery packs 170, 180, 190, 197 are wired together to form a single spacecraft battery. It should be noted that in other embodiments, more or less than four battery packs 170, 180, 190, 197 may be mounted to the anti-nadir panel 195 for the disclosed battery system.

In addition, the anti-nadir panel 195 is shown, for this exemplary design, to be manufactured to have an opening for the central thrust cylinder 198 of the satellite 100. It should be noted that for other embodiments, the anti-nadir panel 195 may be manufactured to have less or more openings of various different shapes and sizes, depending the design of its associated satellite, than the anti-nadir panel 195 shown in FIG. 2.

Figure 3:
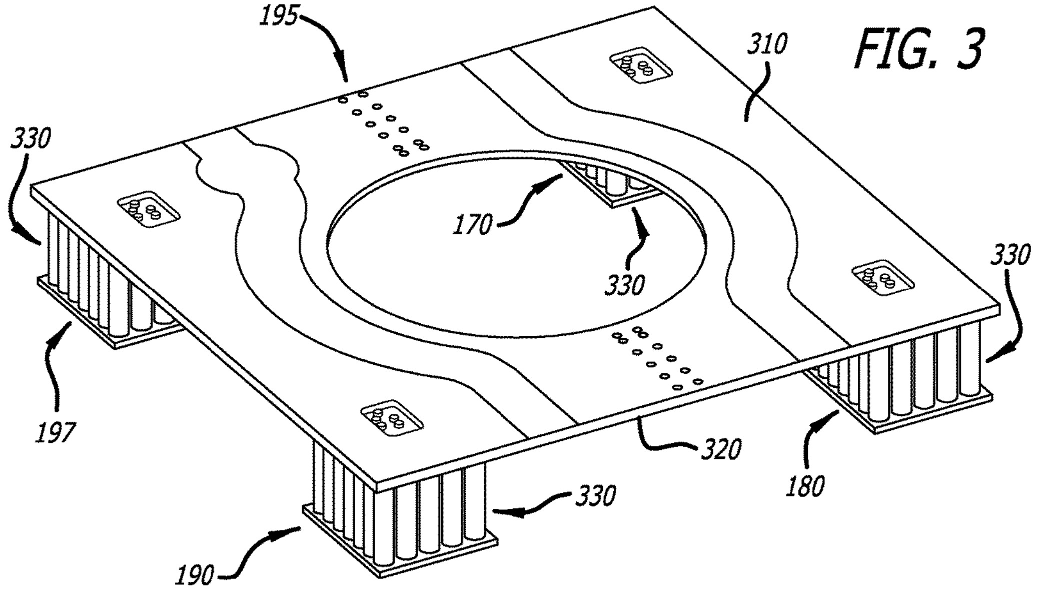
FIG. 3 is a diagram showing an exemplary anti-nadir panel of the disclosed battery system employing four exemplary battery packs, in accordance with at least one embodiment of the present disclosure.

FIG. 3 is a diagram showing an exemplary anti-nadir panel 195 of the disclosed battery system employing four exemplary battery packs 170, 180, 190, 197, in accordance with at least one embodiment of the present disclosure. In this figure, the anti-nadir panel 195 is shown to have a first side (a nadir side) 310 and a second side (an anti-nadir side) 320. The first side 310 of the anti-nadir panel 195 is mounted to the anti-nadir side 160 of the satellite 100. The four battery packs 170, 180, 190, 197 are shown to be mounted to the second side 320 of the anti-nadir panel 195. In addition, each of the four battery packs 170, 180, 190, 197 are shown to include a plurality of battery cells 330. In particular, for this example, each battery pack 170, 180, 190, 197 contains a 5.times.6 matrix of battery cells 330. As such, each battery back 170, 180, 190, 197, for this example, has a total of 30 battery cells 330. It should be noted that in other embodiments, each battery pack may contain more or less than 30 battery cells in various different arrangements, than as shown in this example.

Also shown in FIG. 3, the anti-nadir panel 195 is illustrated to be substantially rectangular in shape. In one or more embodiments, when the disclosed battery system employs an anti-nadir panel 195 that is substantially rectangular in shape and employs two battery packs, the two battery packs will be mounted diagonally from each other in opposite corners of the anti-nadir 195 panel (e.g., battery packs 170 and 190 are shown to be mounted in opposite corners, and battery packs 180 and 197 are shown to be disposed in opposite corners). In at least one embodiment, when the disclosed battery system employs an anti-nadir panel 195 that is substantially rectangular in shape and employs four battery packs, the four battery packs will each be mounted in a different corner of the anti-nadir panel 195 (e.g., as is shown in the example illustrated in FIG. 3, where battery packs 170, 180, 190, and 197 are each mounted in a different corner of the anti-nadir panel 195).

It should be noted that in other embodiments, the anti-nadir panel 195 of the disclosed battery system may be manufactured to be of a different shape than a substantially rectangular shape as is illustrated in the example of FIG. 3. Different shapes that the anti-nadir panel 195 may be manufactured to be include, but are not limited to, a substantially circular shape, a substantially oval shape, a substantially polygonic shape, and an irregular shape.

Figure 4C:
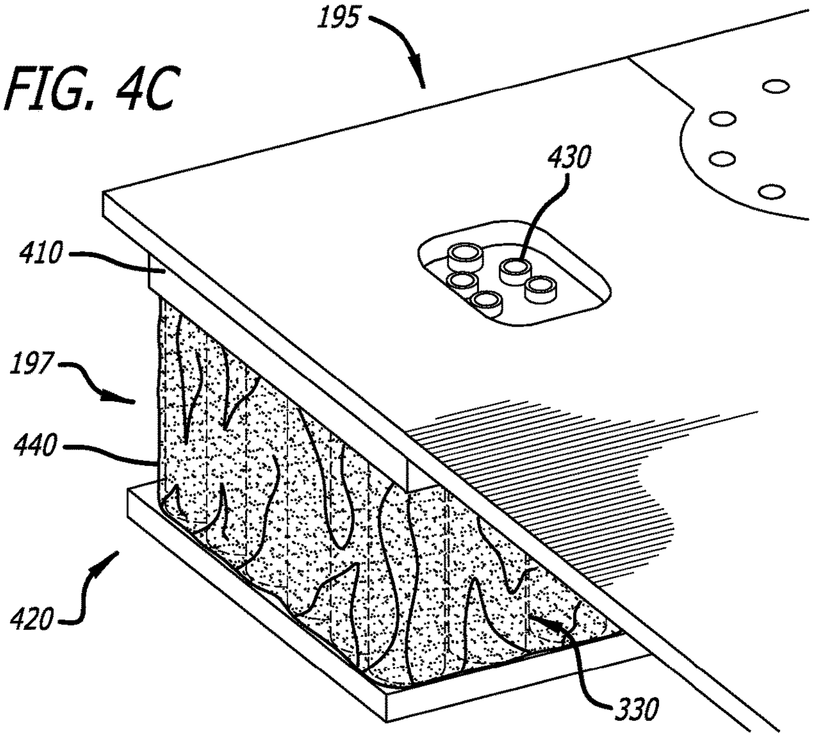
FIG. 4C is a close-up view of one of the four exemplary battery packs mounted to the exemplary anti-nadir panel of FIG. 3, where the battery cells are covered with a thermal blanket, in accordance with at least one embodiment of the present disclosure.

FIG. 4A is a close-up view of one of the four exemplary battery packs 197 mounted to the exemplary anti-nadir panel 195 of FIG. 3, in accordance with at least one embodiment of the present disclosure. In this figure, the battery pack 197 is shown to be bolted with bolts 430 to the anti-nadir panel 195 via a chassis 410. In addition, the battery cells 330 are shown to be fitted into a radiator 420, which is used to dissipate heat generated by the battery cells 330 away from the satellite 100.

It should be noted that in some embodiments, a thermal blanket is employed to cover the external sides of the battery pack 197. For example, a thermal blanket may be employed to cover the exposed exterior sides of the battery cells 330. In one or more embodiments, a multi-layer insulation (MLI) thermal blanket 440 (refer to FIG. 4C) is employed by the disclosed battery system for the thermal blanket. However, it should be noted that in other embodiments, various different types of thermal blankets other than a MLI thermal blanket 440 may be employed.

FIG. 4B is a cutaway view of the exemplary battery pack 197 in FIG. 4A, in accordance with at least one embodiment of the present disclosure. In particular, this figure illustrates how the battery pack 197 is bolted with bolts 430 to the anti-nadir panel 195. In addition, this figure illustrates how the battery cells 330 fit into sleeves formed in the chassis 410.

It should be noted that in other embodiments, the battery pack 197 may mounted to the anti-nadir panel 195 other ways than by the bolting method illustrated in this figure. For example, in some embodiments, the battery pack may be mounted to the anti-nadir panel 195 via a bonding method.

Figure 5:
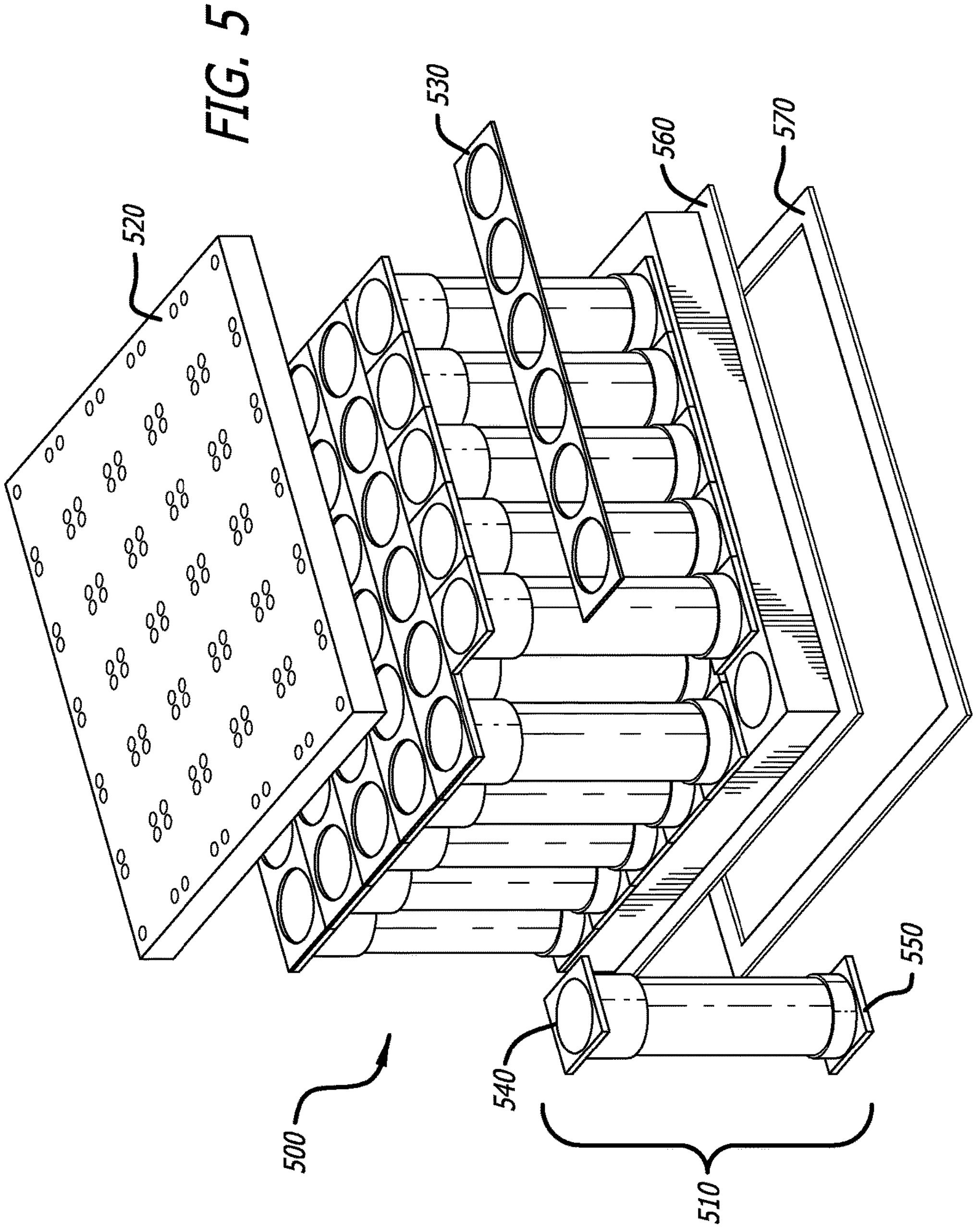
FIG. 5 is an exploded view of an exemplary battery pack of the disclosed battery system, in accordance with at least one embodiment of the present disclosure.

FIG. 5 is an exploded view of an exemplary battery pack 500 of the disclosed battery system, in accordance with at least one embodiment of the present disclosure. In this figure, the battery pack 500 is shown to comprise a plurality of battery cells 510. In particular, the battery pack 500 of FIG. 5 comprises a 5×6 matrix of battery cells 510, for a total of 30 battery cells 510. The battery cells 510 are mounted to the radiator 520 via a bolted interface 540 through a thermal gasket 530. For this example, each thermal gasket 530 is shown to be manufactured to be used for an array of six (6) battery cells 510. As such, for this example, five (5) thermal gaskets 530 are utilized for a single battery pack 500. However, it should be noted that in other embodiments, the thermal gaskets 530 may be manufactured to be used for various different numbers of battery cells 510 that are in an array arrangement, as is the case for this example, or in a matrix arrangement.

Also in this figure, the battery cells 510 are mounted to the anti-nadir panel (not shown) via a bolted interface 550 through a chassis 560 and an optional thermal isolator 570. In this figure, the bolted interface 550 is shown to be substantially rectangular in shape. However, it should be noted that in other embodiments, the bolted interface 550 may be manufactured to be of different shapes other than a substantially rectangular shape, such as a substantially circular shape, a substantially oval shape, a substantially polygonic shape, and an irregular shape.

In addition, it should be noted that for the example of FIG. 5, the battery cells 510 are lithium (Li) ion battery cells. However, for other embodiments, various different types of battery cells may be employed by the disclosed battery system.

Figure 6:
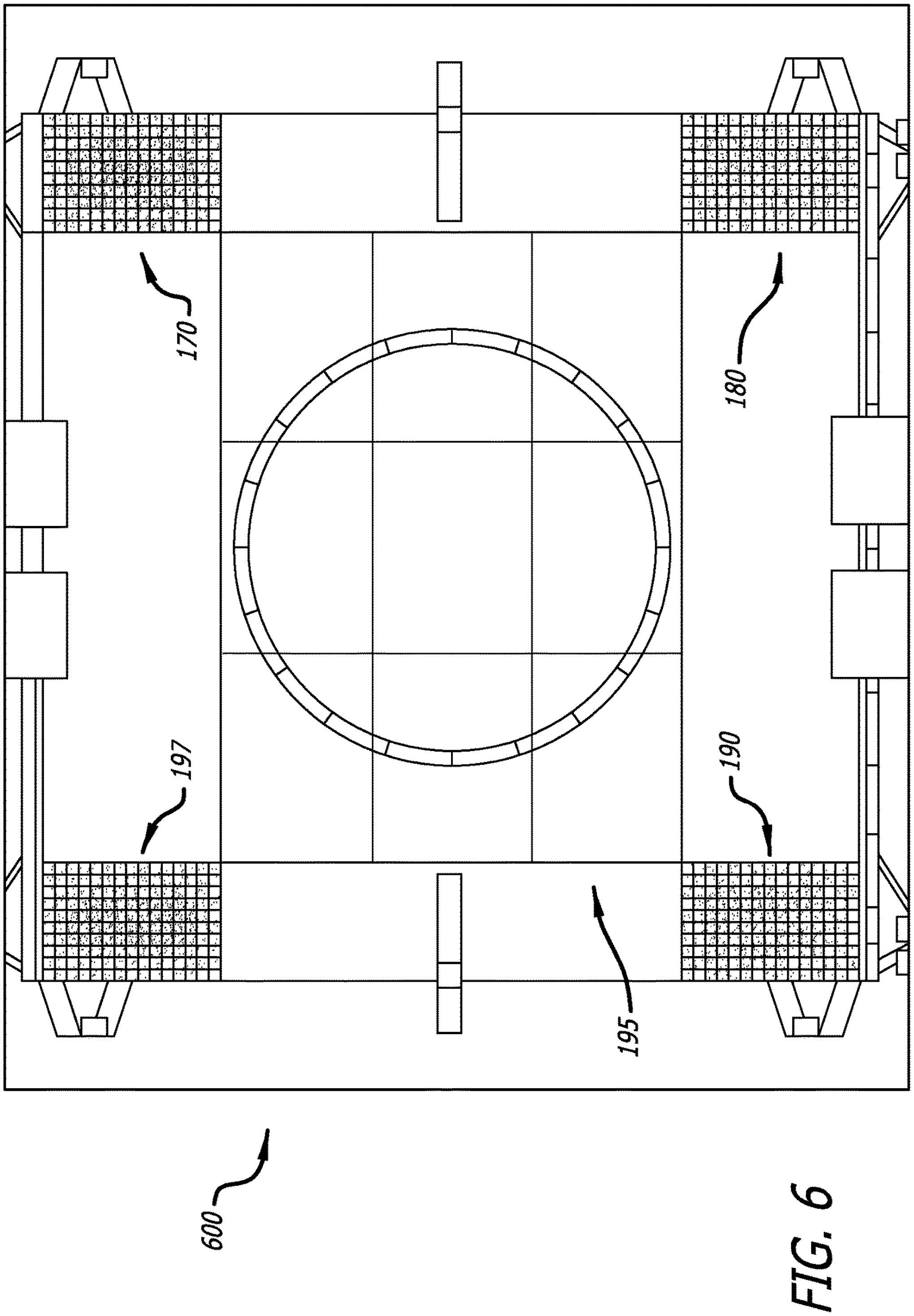
FIG. 6 is a diagram of a thermal model of the exemplary anti-nadir panel of the disclosed battery system employing four exemplary battery packs of FIG. 3, in accordance with at least one embodiment of the present disclosure.

FIG. 6 is a diagram of a thermal model 600 of the exemplary anti-nadir panel 195 of the disclosed battery system employing four exemplary battery packs 170, 180, 190, 197 of FIG. 3, in accordance with at least one embodiment of the present disclosure. In particular, this figure shows the different thermal temperatures experienced by the battery cells of each of the battery packs 170, 180, 190, 197. It should be noted that for this model 600, a MLI thermal blanket was modeled to cover the exposed exterior sides of the battery packs 170, 180, 190, 197, and the optional thermal isolators (refer to the thermal isolator 570 of FIG. 5) were also employed.

As can be seen from this thermal model 600, the battery cells of each battery pack 170, 180, 190, 197 experience very little difference in temperature. This is because, since the battery packs 170, 180, 190, 197 are all mounted on the anti-nadir side of the satellite, they receive substantially the same amount of sun exposure. The only slight temperature differences that can be seen from this model 600 are that the battery cells located towards the center of the battery packs 170, 180, 190, 197 have a slightly higher temperature than the battery cells located along the perimeter of each of the battery packs 170, 180, 190, 197. In addition, it should be noted that the battery packs have substantially the same differential cell charge balancing.

Figure 7:
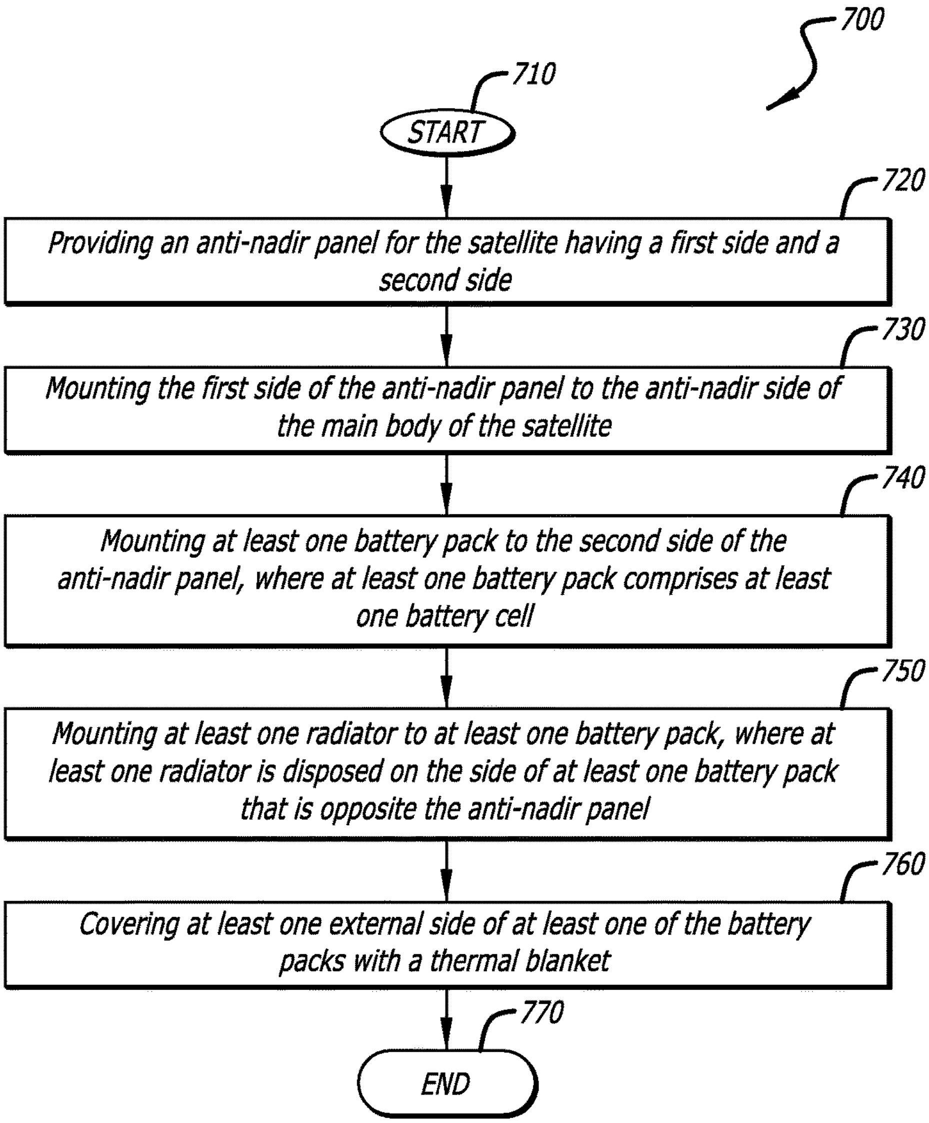
FIG. 7 is a flow chart for the disclosed method for manufacturing a battery system, in accordance with at least one embodiment of the present disclosure.

FIG. 7 is a flow chart for the disclosed method 700 for manufacturing a battery system, in accordance with at least one embodiment of the present disclosure. At the start 710 of the method 700, an anti-nadir panel is provided for a satellite, where the anti-nadir panel has a first side and a second side 720. Then, the first side of the anti-nadir panel is mounted to the anti-nadir side of the main body of the satellite 730. After the anti-nadir panel is mounted, at least one battery pack is mounted to the second side of the anti-nadir panel, where the battery pack(s) comprises at least one battery cell 740. At least one radiator is then mounted to at least one battery pack, where the radiator(s) is disposed on the side of the battery pack(s) that is opposite the anti-nadir panel 750. Then, at least one external side of at least one battery pack is covered with a thermal blanket 760. Then, the method 700 ends 770.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A battery system for a satellite, the system comprising:

an anti-nadir panel for the satellite having a nadir-facing first side and an anti-nadir facing second side, wherein the nadir-facing first side of the anti-nadir panel is mounted to an anti-nadir side of a main body of the satellite such that the nadir-facing first side of the anti-nadir panel is always facing the anti-nadir side of the main body of the satellite;

at least one battery pack mounted to the anti-nadir facing second side of the anti-nadir panel, wherein the at least one battery pack comprises at least one battery cell; and at least one radiator, wherein the at least one radiator is mounted to the at least one battery pack, wherein the at least one radiator comprises a top side, a bottom side, and four edge sides, wherein each of the top side and the bottom side has a larger surface area than each of the four edge sides, and wherein the at least one radiator is disposed on a side of the at least one battery pack that is opposite the anti-nadir panel such that the top side of the at least one radiator is anti-nadir facing when the satellite is in a deployed position and the bottom side of the at least one radiator always faces the anti-nadir side of the main body of the satellite.

2. The system of claim 1, wherein the anti-nadir panel is substantially rectangular in shape.

3. The system of claim 2, wherein when two of the battery packs are mounted to the anti-nadir facing second side of the anti-nadir panel, the two battery packs are disposed diagonally from each other in opposite corners of the anti-nadir panel.

4. The system of claim 2, wherein when four of the battery packs are mounted to the anti-nadir facing second side of the anti-nadir panel, each of the four battery packs are disposed in a different corner of the anti-nadir panel.

5. The system of claim 1, wherein when there is two or more of the battery packs, all of the battery packs have substantially the same thermal environment where all of the battery packs have substantially the same sun exposure.

6. The system of claim 1, wherein when there is two or more of the battery packs, all of the battery packs have substantially the same differential cell charge balancing.

7. The system of claim 1, wherein at least one external side of at least one of the at least one battery pack is covered with a thermal blanket.

8. The system of claim 7, wherein the thermal blanket is a multi-layer insulation (MLI) thermal blanket.

9. The system of claim 1, wherein at least one of the at least one battery cell is a lithium (Li) ion battery cell.

10. The system of claim 1, wherein each of the at least one battery pack is mounted to the anti-nadir facing second side of the anti-nadir panel via a chassis.

11. The system of claim 1, wherein each of the at least one battery pack is mounted to the anti-nadir facing second side of the anti-nadir panel via a thermal isolator.

12. The system of claim 1, wherein the at least one battery pack is mounted to the anti-nadir facing second side of the anti-nadir panel via bonding.

13. The system of claim 1, wherein at least one of the at least one battery cell is mounted to at least one of the at least one radiator via a bolted interface through a thermal gasket.

14. The system of claim 1, wherein each of the at least one battery cell is fitted into a chassis via a respective opening formed within the chassis.

15. A method for manufacturing a battery system for a satellite, the method comprising:

providing an anti-nadir panel for the satellite having a nadir-facing first side and an anti-nadir facing second side;

mounting the nadir-facing first side of the anti-nadir panel to an anti-nadir side of a main body of the satellite such that the nadir-facing first side of the anti-nadir panel is always facing the anti-nadir side of the main body of the satellite;

mounting at least one battery pack to the anti-nadir facing second side of the anti-nadir panel, wherein the at least one battery pack comprises at least one battery cell; and mounting at least one radiator to the at least one battery pack, wherein the at least one radiator comprises a top side, a bottom side, and four edge sides, wherein each of the top side and the bottom side has a larger surface area than each of the four edge sides, and wherein the at least one radiator is disposed on a side of the at least one battery pack that is opposite the anti-nadir panel such that the top side of the at least one radiator is anti-nadir facing when the satellite is in a deployed position and the bottom side of the at least one radiator always faces the anti-nadir side of the main body of the satellite.

16. The method of claim 15, wherein the anti-nadir panel is substantially rectangular in shape.

17. The method of claim 16, wherein when two of the battery packs are mounted to the anti-nadir facing second side of the anti-nadir panel, the two battery packs are disposed diagonally from each other in opposite corners of the anti-nadir panel.

18. The method of claim 16, wherein when four of the battery packs are mounted to the anti-nadir facing second side of the anti-nadir panel, each of the four battery packs are disposed in a different corner of the anti-nadir panel.

19. The method of claim 15, wherein when there is two or more of the battery packs, all of the battery packs have substantially the same thermal environment where all of the battery packs have substantially the same sun exposure.

20. The method of claim 15, wherein when there is two or more of the battery packs, all of the battery packs have substantially the same differential cell charge balancing.

21. The method of claim 15, wherein the method further comprises covering at least one external side of at least one of the at least one battery pack with a thermal blanket.

22. The method of claim 15, wherein at least one of the at least one battery cell is a lithium (Li) ion battery cell.

23. A satellite, comprising:

an anti-nadir panel having a nadir-facing first side and an anti-nadir facing second side, wherein the nadir-facing first side of the anti-nadir panel is mounted to an anti-nadir side of a main body of the satellite such that the nadir-facing first side of the anti-nadir panel is always facing the anti-nadir side of the main body of the satellite;

at least one battery pack mounted to the anti-nadir facing second side of the anti-nadir panel, wherein the at least one battery pack comprises at least one battery cell; and at least one radiator, wherein the at least one radiator is mounted to the at least one battery pack, wherein the at least one radiator comprises a top side, a bottom side, and four edge sides, wherein each of the top side and the bottom side has a larger surface area than each of the four edge sides, and wherein the at least one radiator is disposed on a side of the at least one battery pack that is opposite the anti-nadir panel such that the top side of the at least one radiator is anti-nadir facing when the satellite is in a deployed position and the bottom side of the at least one radiator always faces the anti-nadir side of the main body of the satellite.

24. The satellite of claim 23, wherein the anti-nadir panel is substantially rectangular in shape.

25. The satellite of claim 24, wherein when two of the battery packs are mounted to the anti-nadir facing second side of the anti-nadir panel, the two battery packs are disposed diagonally from each other in opposite corners of the anti-nadir panel.

26. The satellite of claim 24, wherein when four of the battery packs are mounted to the anti-nadir facing second side of the anti-nadir panel, each of the four battery packs are disposed in a different corner of the anti-nadir panel.

27. The satellite of claim 23, wherein when there is two or more of the battery packs, all of the battery packs have substantially the same thermal environment where all of the battery packs have substantially the same sun exposure.

28. The satellite of claim 23, wherein at least one of the at least one battery cell is a lithium (Li) ion battery cell.

* * * * *